United States Patent
Link et al.

[11] Patent Number: 6,086,096
[45] Date of Patent: Jul. 11, 2000

[54] VEHICLE AIR BAG CATCH STRAP ARRANGEMENT

[75] Inventors: Manfred Link, Waiblingen; Wolfgang Russ, Gingen, both of Germany

[73] Assignee: Mercedes-Benz AG, Germany

[21] Appl. No.: 08/239,916

[22] Filed: May 9, 1994

[30] Foreign Application Priority Data

May 7, 1993 [DE] Germany .............................. 43 15 142

[51] Int. Cl.[7] .................................................. B60R 21/16
[52] U.S. Cl. ...................................... 280/743.2; 280/743.1
[58] Field of Search .............................. 280/743.1, 743.2, 280/728.1

[56] References Cited

U.S. PATENT DOCUMENTS

| | | | |
|---|---|---|---|
| 4,830,401 | 5/1989 | Honda | 280/743 A |
| 5,078,423 | 1/1992 | Fujita | 280/743 A |
| 5,165,716 | 11/1992 | Imai et al. | 280/730 |
| 5,205,584 | 4/1993 | Honda | 280/743 A |
| 5,308,113 | 5/1994 | Moriset | 280/743 A |

FOREIGN PATENT DOCUMENTS

| | | | |
|---|---|---|---|
| P 43 15 142 | 5/1996 | Germany . | |
| 6185549 | 12/1984 | Japan | 280/743 R |
| 0071439 | 3/1990 | Japan | 280/743 A |
| 4310449 | 11/1992 | Japan | 280/743 A |
| 2 239 433 | 3/1991 | United Kingdom . | |
| 2261855 | 6/1993 | United Kingdom | 280/743 A |

*Primary Examiner*—Christopher P. Ellis
*Attorney, Agent, or Firm*—Evenson, McKeown, Edwards & Lenahan, P.L.L.C.

[57] ABSTRACT

An air bag for a motor vehicle has catch straps which are located on the inside and by means of which an upper bag surface directed towards a vehicle occupant and a lower-lying bag surface of the unfolded air bag having an opening for a gas generator are held against one another along the length of the catch straps. By one end, the catch straps integrally adjoin a flat connecting part via which they are fixed on the upper bag surface by means of at least one connecting seam which runs around said connecting part and lies nearest to the catch straps, the connecting seam being disposed perpendicular to the pulling direction of said catch strap in the region of each catch-strap connection at least over the greatest part of the connection width.

13 Claims, 2 Drawing Sheets

VEHICLE AIR BAG CATCH STRAP ARRANGEMENT

BACKGROUND AND SUMMARY OF THE INVENTION

The invention relates to an air bag for a motor vehicle having catch straps which are located on the inside and by means of which an upper bag surface directed towards a vehicle occupant and a lower-lying bag surface of the unfolded air bag having an opening for a gas generator are held against one another along the length of the catch straps.

In U.S. Pat. No. 5,165,716, an air bag is described which consists of two bag surfaces, lying one above the other and sewn together at the edge, and whose catch straps are sewn at both ends in each case onto a connecting part made of material, after which each connecting part is sewn to one of the two bag surfaces. The seam selected for this connection to the bag surface differs from the customary circular seam and is disposed in each case perpendicular to the longitudinal axis of the catch straps in order, as a result, to obtain a more favorable loading pattern of the material by the catch straps. This seam, which can only be made on a sewing machine in a complicated manner, is firstly carried out on each flat-lying bag surface. Subsequently, the bag surfaces have to be sewn to one another on the circumference with their outsides located opposite one another, after which the air bag is inverted so that the circumferential edges come to rest on the inside. Consequently, in the execution of the circumferential seam, in this case the integral catch straps which have already been sewn onto their connecting parts at both ends lie around the outside of the bag surfaces, thus making the sewing operation more difficult. Later fixing of the catch straps to the respective connecting part would be impeded by its fixing seam.

U.S. Pat. No. 5,033,771 shows an air bag in which only the seams for fixing the connecting parts are carried out perpendicular to the extent of the catch straps. The seams for fixing the catch straps are made on a circular arc above the latter, as a result of which, when force is introduced, punctiform load peaks can occur. These catch straps are likewise integral.

An air bag for a vehicle is known from British Patent Document GB-B-1,438,032, in which catch straps define the shape of the inflated air bag. The catch straps extend integrally from an attachment plate which is sewn onto the air bag. With an attachment seam which is closed in the manner of a circle, under tensile loading of the catch straps the latter are loaded very differently over their course, in which case a section which is subjected to greater loading can give way and the connection may be torn open at this point.

From the prior art which is quite comprehensive in this sector, reference is made to the following publications concerning the general background: German Patent Document DE-C-2,152,902, U.S. Pat. No. 3,618,979 and U.S. Pat. No. 3,945,665.

An object of the invention is to simplify the production of an air bag of the general type. This object is achieved by providing an air bag arrangement wherein the catch straps adjoin flat connecting parts via which they are fixed on the upper and lower bag surface by means of at least one connecting seam which extends around the respective connecting part, a connecting seam lying nearest to the catch straps being disposed perpendicular to the pulling direction of said catch strap in the region of each catch-strap connection over at least the greatest part of the connection width, and wherein the catch straps are subdivided into two parts in their length and each catch-strap part integrally adjoins a respective assigned flat connecting part.

The fixing of the catch straps via a connecting part constructed integrally therewith by sewing to the upper bag surface, the connecting seam lying nearest to the catch straps in the region of each catch-strap connection being disposed, at least over the greatest part of the connection width, perpendicular to the pulling direction of said catch strap, leads to an even loading of this connection under the effect of tension via the catch straps which, when the air bag is filled, are brought into an extended position which holds the bag surfaces against one another.

This improved course of the seam can likewise be used for such a fixing of the catch straps on the lower-lying bag surface, for which reason the catch straps are then designed in two parts in their length so that firstly the connecting parts are-sewn onto their flat-lying bag surfaces and the two halves of each catch strap are only joined together after the bag surfaces have been connected to one another.

This subdivision of each catch strap should preferably be carried out nearer to the lower-lying bag surface since the opening for the gas generator is provided here, through which opening the catch-strap halves or parts can be pulled outwards and sewn. By means of this division, a sufficient length is provided for both catch-strap parts when being pulled through the opening, and the overlap at their connecting seam does not lie precisely on the central folding point of the catch straps when the air bag is folded together, thus not unnecessarily increasing the folding height of the air bag.

In the case of three catch straps being provided, arranged approximately evenly, the course of the seam is advantageously designed as a hexagon, as a result of which the seam can lie disposed in each case in the region of each catch-strap connection, and the flat connecting part is held around the outside of the bag surface. Changes in direction in this seam are preferably to be carried out in a rounded manner in order to counteract the material tearing out at a corner.

On the lower-lying connecting part, the connecting seam is protected by a metal heat guard against the effect of temperature due to the gases flowing against it from the gas generator, as a result of which said connecting seam can also be used for attaching a flame-proof material which protects the surroundings of the gas generator inside the bag.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
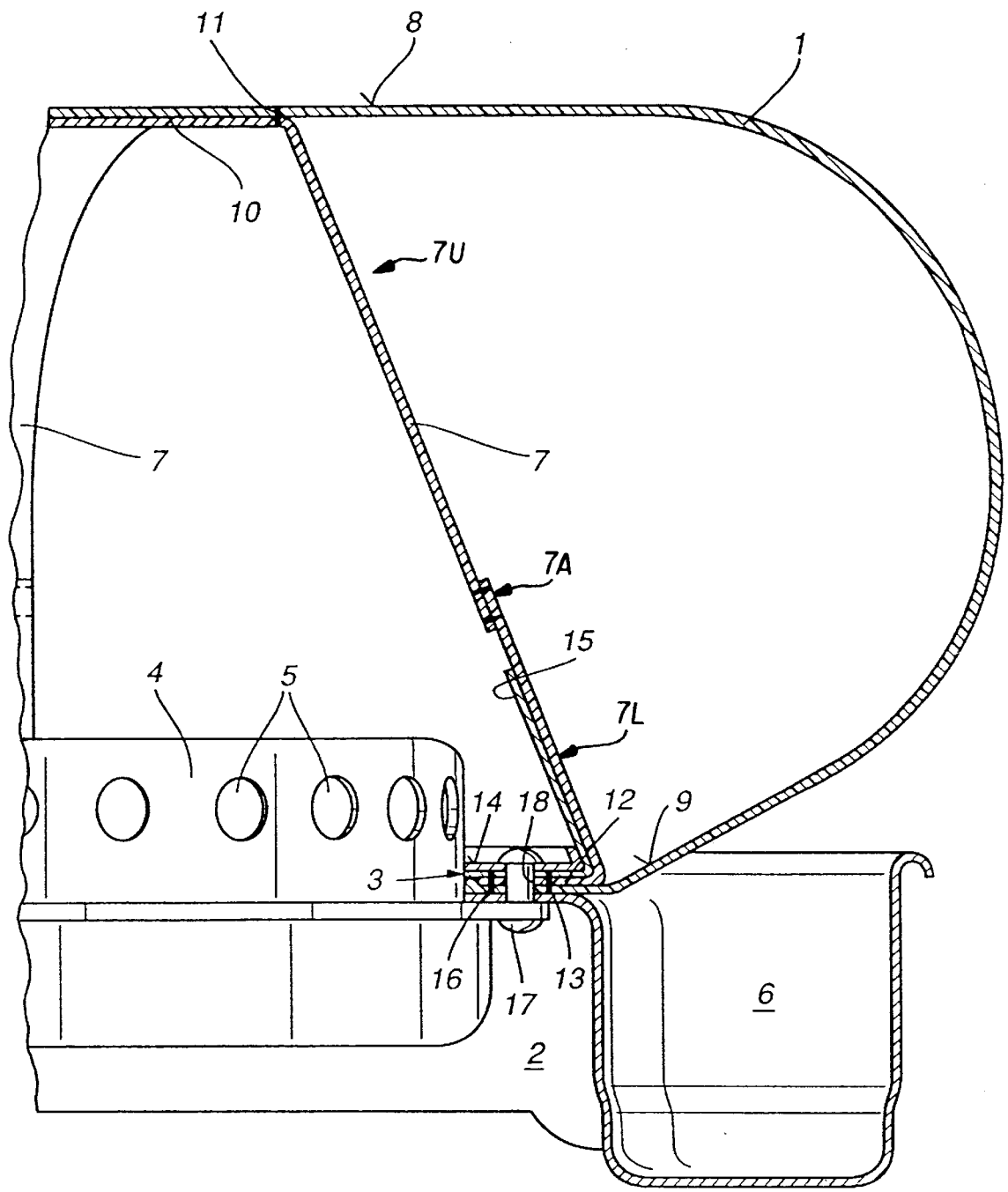
FIG. 1 is a sectional schematic view of a portion of an inflated air bag and its air bag receiver, constructed according to a preferred embodiment of the invention.

In FIG. 1, approximately half of an inflated air bag 1 for a motor vehicle is illustrated, which air bag protects a vehicle occupant from a hard impact inside the vehicle during an accident. The air bag 1 is fixed on an air bag housing 2 (not illustrated in detail) and has an opening 3 through which a gas generator 4 protrudes with its gas outlet apertures 5 through which, when the gas generator 4 has been triggered, gas flows into the air bag 1 and converts said air bag from a state of rest folded up in a receiving container 6 into the inflated state illustrated.

In order that the air bag 1 assumes an inflated shape which is favorable in the event of impact, catch straps 7 lying inside the air bag 1 are provided. By means of catch straps 7, an upper bag surface 8 directed towards a vehicle occupant and a lower-lying bag surface 9 of the unfolded air bag 1 having the opening 3 for the gas generator 4 are held against one another along the length of the catch straps 7.

Figure 2:
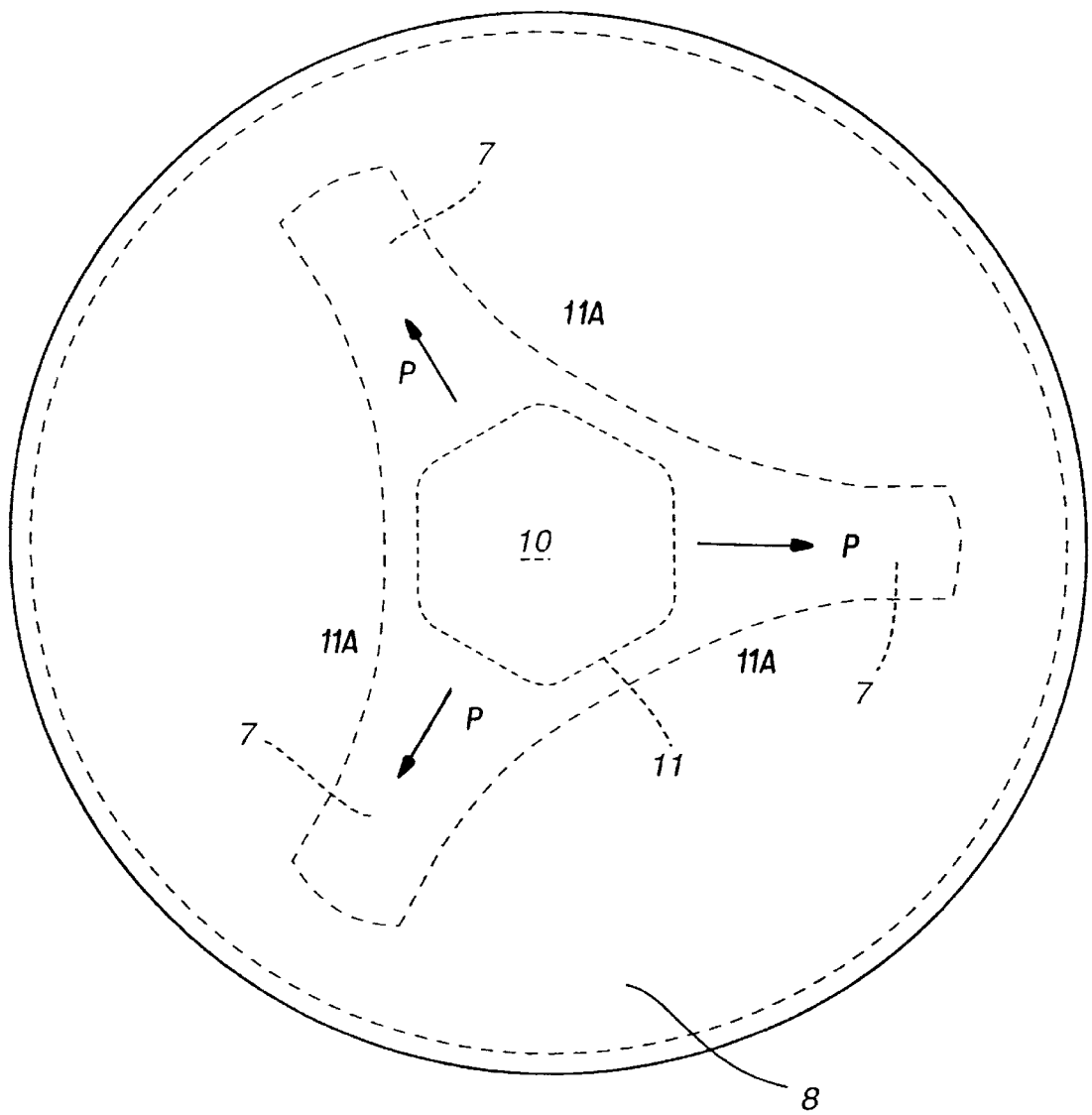
FIG. 2 is a schematic plan view of the upper, flat-lying bag surface with the sewn-on connecting part of the arrangement of FIG. 1.

As is shown more precisely in FIG. 2, the catch straps 7 adjoin a flat connecting part 10 radially and integrally at their end belonging to the upper bag surface 8. The catch straps and flat connecting part 10 are fixed to the upper bag surface 8 by a connecting seam 11 extending around the connecting part. The connecting seam portions 11A lying nearest to the catch straps 7 extends perpendicular to the pulling direction P of the respective catch strap 7 in the transition region of each catch-strap connection to the connecting part 10 at least over the greatest part of the connection width. It is thus achieved that the connecting seam 11 is loaded evenly by the tension of the catch straps 7. Since three catch straps adjoin the connecting part 10, the connecting seam 11 is designed as a hexagon so that, in addition to the course of the seam being disposed in the region of the connection seam portion 11A of each catch strap 7, a peripheral fixing of the connecting part 10 on the upper bag surface 8 is also guaranteed. Changes in direction, that is to say the corners C of said hexagon, are designed in a rounded manner in this case so that the connecting seam 11 does not tear out here.

The catch straps 7 are also fixed by their other end via a connecting part 12, which is integral with said catch straps, on the lower-lying bag surface 9 by means of a connecting seam 13. In this case, the course of this connecting seam 13 can correspond to the course of the upper connecting seam 11 so that the catch straps 7 are mainly loaded in the respective pulling direction P. If the connecting parts 10 and 12 are firstly sewn onto their bag surfaces 8 and 9 respectively, and the bag surfaces 8 and 9 are then connected to one another along the circumference, it is sensible to provide the catch straps 7 so as to be subdivided in their length and only subsequently to connect the catch-strap parts to one another (at seams 7A, as shown in FIG. 1). This sewing of the upper catch-strap parts 7U to the corresponding lower catch-strap parts 7L, to be carried out finally, becomes simpler if the catch straps 7 are in two parts nearer to the lower-lying bag surface 9, as a result of which a sufficient length is provided for both parts for guiding them out of the air bag 1 through the opening 3. Additionally, this connection 7A not lying half way up does not cause such bulk in height when the air bag 1 is folded into the receiving container 6.

Since the catch strap parts 7L on the lower-lying bag surface 9 are subjected to the hot gases from the gas generator 3, a disc-shaped, metal heat guard 14 which covers the connecting seam 13 is provided to protect them from these temperatures, on the one hand, and a likewise disc-shaped flame-proof material 15 is inserted. Since the lower-lying connecting seam 13 lies in a protected manner, the flame-proof material 15 can be sewn onto the lower bag surface 9 likewise by the connecting seam 13 together with the catch straps 7. These three layers of material (bag surface 9, catch strap 7, flame-proof material 15) are held together by a further circumferential seam 16 so that rivets 17 and screws for fixing the air bag 1 on the air bag housing 2 do not tear out of the passage openings 18, provided for this purpose and arranged in a circle-like manner around the outside, through these layers of material.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air bag for a motor vehicle, having catch straps which are located on the inside and by means of which an upper bag surface directed towards a vehicle occupant and a lower-lying bag surface of the unfolded air bag having an opening for a gas generator are held against one another along the length of the catch straps, wherein the catch straps adjoin flat connecting parts via which they are fixed on the upper and the lower bag surface by means of a connecting seam which extends around the respective connecting part and having respective connecting seam sections lying nearest to the respective catch straps which are disposed perpendicular to the pulling direction of said respective catch strap in the region of each respective catch-strap connection over at least the greatest part of the connection width, and wherein the catch straps are subdivided into two parts in their length, and each catch-strap part integrally adjoins a respective assigned flat connecting part.

2. Air bag according to claim 1, wherein the catch straps are subdivided in the two parts at a location nearer to the lower-lying bag surface than to the upper bag surface when the air bag is in an inflated condition.

3. A method of making an air bag for a motor vehicle of the type having catch straps located inside the air bag for holding an upper bag surface directed towards a vehicle occupant together with a lower bag surface having an opening for a gas generator, said method comprising:

providing an upper flat connecting part at the upper bag surface, said upper flat connecting part being connected to the upper bag surface by an upper connecting seam extending around the upper connecting part, said upper connecting seam including a plurality of interconnected upper connecting seam sections extending substantially perpendicular to radial lines from a center of the upper bag surface, providing a lower flat connecting part at the lower bag surface, said lower flat connecting part being connected to the lower bag surface by a lower connecting seam extending around the lower connecting part, said lower connecting seam including a plurality of interconnected lower connecting seam sections extending substantially perpendicular to radial lines from a center of the lower bag surface, providing the catch straps in respective first and second parts, sewing the first catch strap part to the upper bag surface along respective ones of the upper connecting seam sections such that the connecting seam sections disposed nearest to the catch straps are disposed perpendicular to the pulling direction of said associated catch strap in the region of the connection of the catch-strap connection over at least the greatest part of the connection width, sewing the second catch strap part to the lower bag surface, and subsequently sewing the first and second catch strap parts to one another along respective catch strap connecting seams.

4. A method according to claim 3, wherein the catch strap connecting seams are disposed nearer to the lower bag surface than to the upper bag surface when the air bag is in an installed inflated in-use condition.

5. A method according to claim 3, wherein said sewing the second strap part to the lower bag surface includes sewing the second catch strap part along one of the lower connecting seam sections such th at the connecting seams are disposed perpendicular to the pulling direction of the associated catch strap in the region of the catch-strap connection over at least the greatest part of the connection width.

6. A method according to claim 4, wherein said sewing the second strap part to the lower bag surface includes sewing the second catch strap part along one of the lower connecting seam sections such that the connecting seams are disposed perpendicular to the pulling direction of the associated catch strap in the region of the catch-strap connection over at least the greatest part of the connection width.

7. Air bag for a motor vehicle, comprising:

an upper bag portion having an upper bag surface which in use is directed toward a vehicle occupant, a lower bag portion having an opening for a gas generator, an upper flat connecting part with a plurality of integrally connected upper catch strap sections extending radially therefrom, an upper connecting seam extending around the upper flat connecting part and connecting the upper bag portion with the upper flat connecting part, said upper connecting seam extending perpendicularly to in use pulling directions of respective ones of said upper catch strap sections over a majority of the connection width of the upper catch strap sections with the upper flat connecting part and upper bag portion, and a plurality of lower catch strap sections extending from the lower bag portion to strap section connections at respective ones of the upper catch strap sections, said upper and lower catch strap sections serving together to connect the upper and lower bag portions and control expansion movement of the upper bag portion during inflation of the air bag.

8. Air bag according to claim 7, wherein said upper connecting seam exhibits a polygon shape with respective sides of said polygon shape forming the connection width with the respective upper catch strap sections.

9. Air bag according to claim 8, wherein said polygon shape is a hexagon shape, and wherein a total of three of said upper catch strap sections are connected at respective alternate sides of said hexagon shape connecting seam.

10. Air bag according to claim 7, comprising a lower flat connecting part with said lower catch strap sections integrally formed therewith, and a lower connecting seam extending around the lower flat connecting part and connecting the lower bag portion with the lower flat connecting part, said lower connecting seam extending perpendicularly to in use pulling direction of respective ones of said lower catch strap sections over a majority of the connection width of the lower catch strap sections with the lower flat connecting part and lower bag portion.

11. Air bag according to claim 9, comprising a lower flat connecting part with said lower catch strap sections integrally formed therewith, and a lower connecting seam extending around the lower flat connecting part and connecting the lower bag portion with the lower flat connecting part, said lower connecting seam extending perpendicularly to in use pulling direction of respective ones of said lower catch strap sections over a majority of the connection width of the lower catch strap sections with the lower flat connecting part and lower bag portion.

12. Air bag according to claim 11, wherein said lower connecting seam has a course corresponding to the upper connecting seam.

13. Air bag according to claim 12, wherein the strap section connections are located nearer the lower bag portion than the upper bag portion when the air bag is in an inflated in use condition.

* * * * *